UNITED STATES PATENT OFFICE.

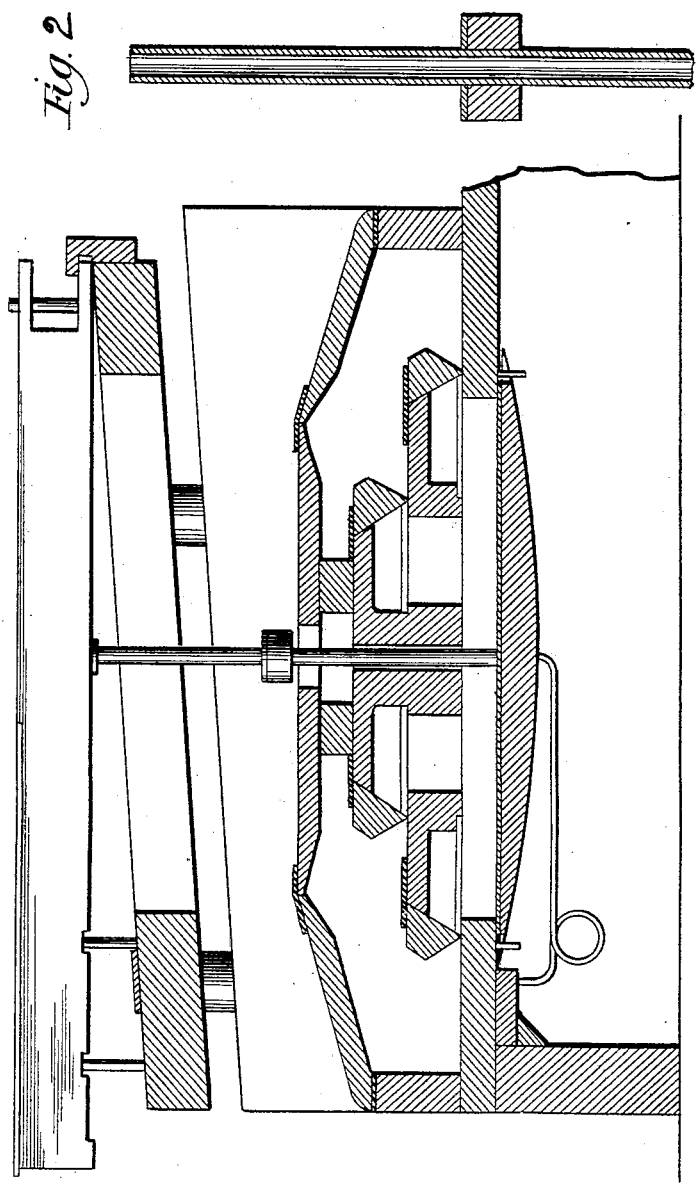

MELVILLE CLARK, OF CHICAGO, ILLINOIS.

PITMAN FOR REED-ORGAN ACTIONS.

SPECIFICATION forming part of Letters Patent No. 394,248, dated December 11, 1888.

Application filed June 6, 1888. Serial No. 276,233. (No model.)

*To all whom it may concern:*

Be it known that I, MELVILLE CLARK, a citizen of the United States, residing at Chicago, county of Cook, and State of Illinois, have invented certain new and useful Improvements in Pitmen for Reed-Organ Actions, which are fully set forth in the following specification, reference being had to the accompanying drawings, forming a part thereof.

In the drawings, Figure 1 is a vertical section from front to rear through the key-board and action of a reed-organ of common construction. Fig. 2 is a longitudinal section through the pitman which constitutes my invention. Fig. 3 is a transverse section of the same.

It is a fact well known among those familiar with the art of reed-organ building that the pitmen, or "tracker-pins," as they are sometimes termed, (that is to say, the vertical plungers which communicate the motion received from the pressure upon the key to the valve which admits air to the reed,) are often the occasion of great difficulty and annoyance, on account of the fact that said pitmen, which are almost necessarily made of wood, (metal being too heavy and other light substances being too expensive,) are liable to warp, shrink, and swell with the varying condition of the atmosphere as to dryness, so that in a very dry climate or dry season the pitmen become loose and rattle, and in a wet climate or season they swell and warp and stick fast in their guideways. Another reason for the preference for wood as a material of which to construct this pitman is that it is necessary to have material which can be very easily dressed off at the ends, as is the practice in leveling the keys, and this necessity practically bars all metals. Attempts have been made to cure the defect above noted, due to the liability of the wood to warp, shrink, and swell with varying degrees of moisture, by covering the pitmen with sheet metal; but it is necessary even then, for the purpose last above stated, to leave the ends exposed, so that they may be readily dressed off, and the construction is too expensive to be desirable.

I have found that by making the pitmen tubular, so that the air has access within them throughout their entire length and can circulate freely through them, the difficulty due to the effect of moisture is practically removed, and that any ordinary changes in the condition of the atmosphere in that respect have no perceptible effect in shrinking them or swelling them, or, at least, such shrinking or swelling as may occur due to that cause does not become manifest in any change in the outside diameter of such tubular pitmen, nor cause them to warp and bind in their bearings or guideways.

There are several species of endogenous plants, of which that known as "Japanese reed" is a notable instance, which grow in a form and of suitable size to serve the purpose of such tubular pitmen, and I have found it economical to use such vegetable product for the purpose. I do not, however, limit myself to tubular pitmen when made of such natural vegetable product, because when made tubular artificially the same effect is still obtained.

I claim—

In an organ-action, pitmen made of wooden tubes, substantially as and for the purpose set forth.

In testimony whereof I have hereunto set my hand, in the presence of two witnesses, at Chicago, Illinois, this 29th day of May, A. D. 1888.

MELVILLE CLARK.

Witnesses:
CHAS. S. BURTON,
E. F. BURTON.